US012785790B2

(12) United States Patent
Srinivasan et al.

(10) Patent No.: US 12,785,790 B2
(45) Date of Patent: Nov. 3, 2026

(54) EFB OR AID COMMUNICATION MEDIA FOR DATALINK MESSAGE TRANSMISSION AND RECEPTION

(71) Applicant: Honeywell International Inc., Charlotte, NC (US)

(72) Inventors: Divya Swarup Giriyappa Srinivasan, Bangalore (IN); Thomas D. Judd, Phoenix, AZ (US)

(73) Assignee: Honeywell Aerospace US LLC, Phoenix, AZ (US)

( * ) Notice: Subject to any disclaimer, the term of this patent is extended or adjusted under 35 U.S.C. 154(b) by 339 days.

(21) Appl. No.: 18/429,839

(22) Filed: Feb. 1, 2024

(65) Prior Publication Data

US 2025/0253929 A1 Aug. 7, 2025

(51) Int. Cl.
*H04B 7/185* (2006.01)

(52) U.S. Cl.
CPC ................................ *H04B 7/18506* (2013.01)

(58) Field of Classification Search
CPC ................................................. H04B 7/18506
See application file for complete search history.

(56) References Cited

U.S. PATENT DOCUMENTS 9,719,799 B2 * 8/2017 Pandit .................... G01C 23/00
10,666,764 B2 5/2020 Judd et al.
10,707,951 B2 * 7/2020 Hathaway ............... G06F 17/00
10,798,033 B2 10/2020 Judd et al.
11,258,863 B1 * 2/2022 Hochwarth ........... H04L 67/146
2007/0027589 A1 * 2/2007 Brinkley ................ G07C 5/008 701/3
2007/0055416 A1 * 3/2007 Allen ....................... G08G 5/26 701/3
2007/0219676 A1 * 9/2007 Allen ..................... G01C 23/00 701/4
2016/0373184 A1 * 12/2016 Oder .................. H04B 7/18506
2020/0402412 A1 * 12/2020 Shamasundar .......... G08G 5/34
2021/0142681 A1 * 5/2021 Hochwarth .............. G08G 5/21
2021/0409272 A1 * 12/2021 Leal Herrera .......... H04L 67/12

FOREIGN PATENT DOCUMENTS

EP 2980773 A1 2/2016

* cited by examiner

*Primary Examiner* — Kenneth T Lam
(74) *Attorney, Agent, or Firm* — Fogg & Powers LLC

(57) ABSTRACT

Embodiments are directed to utilizing non-traditional communication links to communicate datalink messages between a vehicle and at least one ground station. While a communications management system on the vehicle generally transmits and receives datalink messages, an electronic flight bag includes one or more communication links that are used to receive and transmit datalink messages independently of the communication links on the communications management system. An avionics interface device can also include one or more communication links configured for datalink communication independent of the communications management system.

20 Claims, 7 Drawing Sheets

EFB OR AID COMMUNICATION MEDIA FOR DATALINK MESSAGE TRANSMISSION AND RECEPTION

BACKGROUND

In the aerial navigation context, aircraft communicate with external entities before takeoff, during navigation, and upon arriving at a destination. For example, aircraft send and receive messages from one or more ground stations when the aircraft is approaching a landing site. Modern aircraft utilize Aircraft Communication Addressing and Reporting Systems (ACARS) for sending ACARS messages to the ground station and for receiving an ACARS message from a ground station. These messages are typically represented to the aircraft in the form of text datalink messages that are displayed on an avionics device associated with the aircraft.

Some aircraft receive and transmit ACARS messages via a communications management unit (CMU). The CMU acts as a router for the avionics devices in the aircraft and as the central communication entity to the ground station. When the CMU receives a downlink message from one of the avionics devices, it sends the downlink message to the ground station using one of the communication links supported by the CMU. However, a CMU has only a limited number of communication links available at a given time, and may have multiple messages queued to be transmitted. Additionally, some communication links are preferred over others due to bandwidth limitations, lower costs, or industry requirements, but these may not be available when a downlink message is ready to be transmitted.

SUMMARY

The details of one or more embodiments are set forth in the summary and following description. The features illustrated or described in connection with one exemplary embodiment may be combined with the features of other embodiments. Thus, any of the various embodiments described herein can be combined to provide further embodiments. Aspects of the embodiments can be modified, if necessary to employ concepts of the various patents, applications and publications as identified herein to provide yet further embodiments.

In one embodiment, a system is disclosed. The system comprises a communications management system coupled to a vehicle. The communications management system is configured to receive a downlink message from an avionics device onboard the vehicle. The system comprises an electronic flight bag (EFB) coupled to the communications management system. The EFB is configured for datalink communications using at least one communication link associated with the EFB. The EFB is configured to receive the downlink message. The EFB is configured to transmit the downlink message to at least one ground station via the at least one communication link associated with the EFB.

In another embodiment, a method for datalink communication between a vehicle and at least one ground station is disclosed. The method comprises, for a downlink message: receiving, at a communications management system coupled to the vehicle, a first downlink message from an avionics device communicatively coupled to the communications management system. The method comprises forwarding the first downlink message from the communications management system to at least one of: an electronic flight bag (EFB) and/or an aircraft interface device (AID). The EFB and/or the AID are configured for datalink communications using at least one communication link associated with the EFB and/or the AID. The method comprises transmitting the first downlink message from at least one of: the EFB and/or the AID to the at least one ground station using the at least one communication link. For an uplink message, the method comprises receiving, at the at least one of: the EFB and/or the AID, a first uplink message from the at least one ground station via the at least one communication link. The first uplink message is intended for the avionics device. The method comprises forwarding the first uplink message from the at least one of: the EFB and/or the AID to the communications management system. The method comprises forwarding the first uplink message from the communications management system to the avionics device.

In yet another embodiment, an avionics device configured to be coupled to a communications management system onboard a vehicle is disclosed. The avionics device comprises a communication interface. The communication interface is configured to receive a downlink message from the communications management system. The avionics device comprises at least one processor coupled to the communication interface. The at least one processor is configured to execute a datalink application for processing datalink messages including the downlink message. The avionics device comprises a datalink transceiver coupled to the communication interface. The datalink transceiver is configured to establish at least one communication link with at least one ground station. The datalink transceiver is configured to transmit the downlink message via the at least one communication link.

BRIEF DESCRIPTION OF THE DRAWINGS

Understanding that the drawings depict only exemplary embodiments and are not therefore to be considered limiting in scope, the exemplary embodiments will be described with additional specificity and detail through the use of the accompanying drawings, as summarized as follows and as described further in the detailed description.

Figure 1:
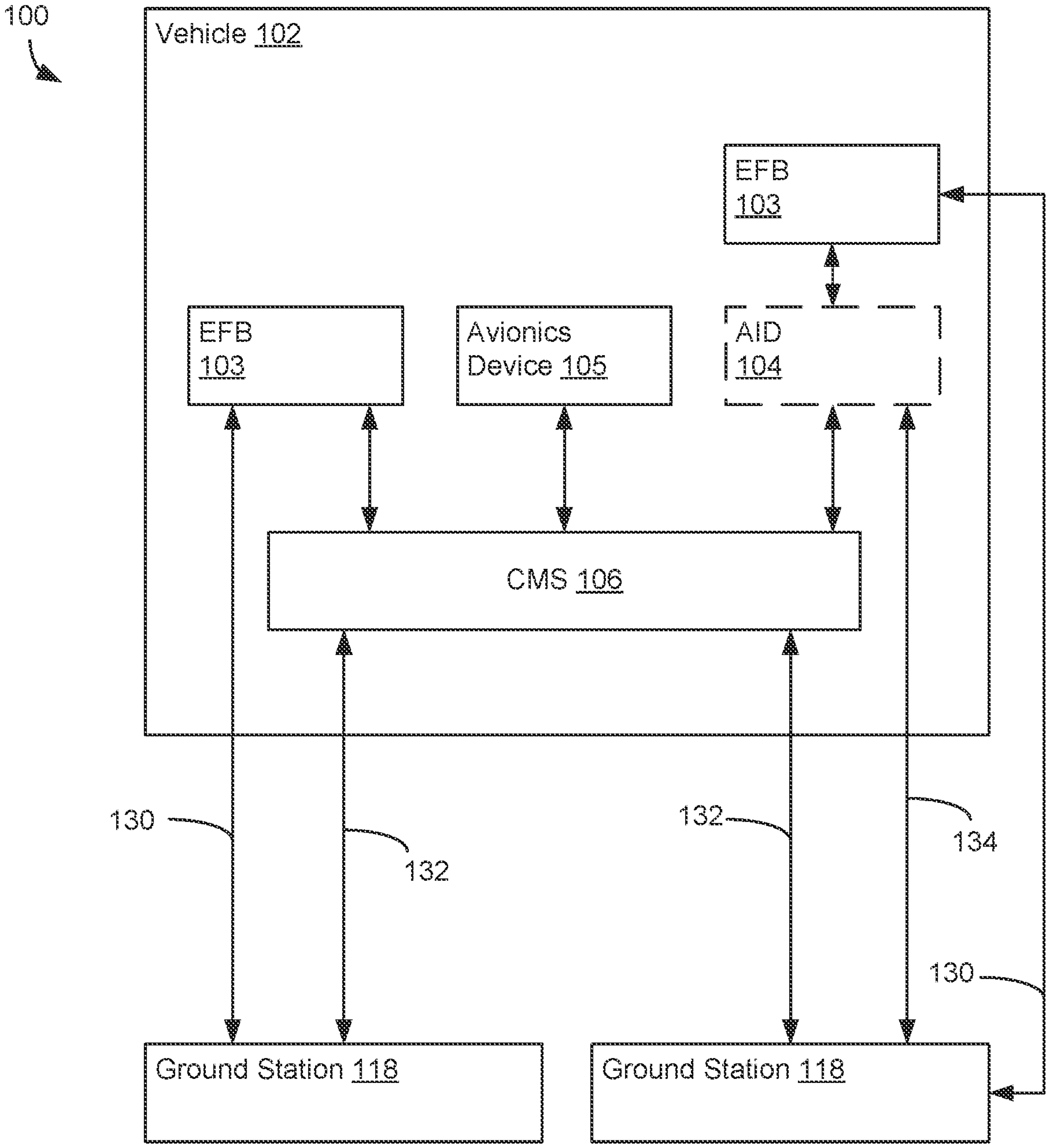
FIG. 1 depicts a block diagram of a system for communicating datalink messages between a vehicle and at least one ground station, as described in one or more embodiments.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized and that logical, mechanical, and electrical changes may be made. Furthermore, the methods presented in the drawing figures and the specification are not to be construed as limiting the order in which the individual steps may be performed. The following detailed description is, therefore, not to be taken in a limiting sense.

FIG. 1 depicts a block diagram of a system 100 for communicating datalink messages between a vehicle and at least one ground station. Use of the term "vehicle" is not intended to be limiting and includes all class of vehicles configured for datalink communication that fall within the ordinary meaning of the term. This would include but not limited to, aerial traversing vehicles (e.g., commercial, non-commercial, or recreational aircraft), unmanned and/or space traversing vehicles (e.g., satellites, urban air mobility vehicles), water traversing vehicles (e.g., ships, submarines), and land traversing vehicles (e.g., automobiles including cars, trucks, motorcycles). Throughout the disclosure, the vehicle 102 is further illustrated as an aircraft understanding that the principles described herein apply to other vehicles where applicable.

Vehicle 102 includes at least one avionics device 105 coupled to a communications management system (CMS) 106. Avionics device 105 can be an onboard avionics device that is affixed to (for example, mounted on) the interior of the vehicle 102, such as the cockpit or electronic equipment (EE) bay. Alternatively, avionics device 105 is an offboard avionics device that is portable and can be taken on and off the vehicle 102. Examples of onboard and offboard avionics devices include a navigational display device, a primary flight display, a Maintenance Terminal, a Cabin terminal, aircraft condition monitoring system (ACMS), or a tablet, smartphone, or other portable electronic device (PED) that is configured for running one or more avionics applications with a display or interface. Some of the avionics devices 105 include at least one human-machine interface (HMI) that is configured to display and visualize data to the vehicle personnel (for example, operator and flight crew), and also enables the personnel to input or select data. For example, the HMI on the avionics device 105 includes or is coupled to any kind of input device (computer mouse, buttons, switches, keyboard, curser control device, display, and the like). In some examples, the HMI on the avionics device 105 includes a screen with touchscreen functionality or cursor selection capability so that the vehicle personnel can input data directly on the screen. Alternatively, avionics device 105 does not include an individual HMI and instead interfaces to one or more HMIs implemented on vehicle 102 (which can be shared between different avionics devices).

One specific example of an avionics device in FIG. 1 is the electronic flight bag (EFB) 103. EFB 103 acts as a specialized navigation instrument, and is configured to store and display navigational mapping data and navigational tools used by the vehicle personnel. In some embodiments, EFB 103 is configured to perform flight planning functions. EFB 103 can be an offboard avionics device implemented using a PED configured for datalink functionality, as described in FIG. 3. One or more of EFBs 103 can be directly coupled to CMS 106 via a wired connection.

In the embodiment of FIG. 1, each EFB 103 includes its own associated communication link(s) 130 that can be used to transmit or receive datalink messages to and from a ground station 118. For example, when a downlink message is approved to be sent to the ground station 118, in some embodiments EFB 103 bypasses CMS 106 and transmits the downlink message to the ground station 118 using one of the communication links 130 associated with EFB 103. Such communication links 130 can include WiFi links, cellular links, or other communication links suitable for datalink communication. In some embodiments, EFB 103 can send the downlink message first to CMS 106 for review to make sure the downlink message complies with industry standards stored in the AOC database 220 (see FIG. 2). Once CMS 106 reviews and confirms the downlink message is proper, the downlink message can then be sent using one of the communication links 130 associated with EFB 103 or one of the communication links 132 of CMS 106 or one of the communication links 134 offered by AID 104.

Another advantage of the datalink compatibility of EFB 103 is that downlink messages generated by other avionics devices 105 can be transmitted over communication links 130 associated with EFB 103 instead of being queued for transmission by CMS 106. For example, when a downlink message from avionics device 105 is generated, it is conventionally sent to CMS 106 and queued for transmission when one of the communication links 132 of CMS 106 is available. However, avionics device 105 can take advantage of the additional communication links 130 offered by EFB 103 (and also the communication links 134 offered by AID 104). Upon sending the downlink message to CMS 106, CMS 106 then forwards the downlink message to EFB 103 and the EFB 103 is configured to transmit the downlink message originating from avionics device 105 to ground station 118 via one of the communication links 130 associated with EFB 103. As a result, downlink messages can be processed faster and frees up the bandwidth used by CMS 106 for transmitting other datalink messages to ground stations 118. Embodiments of downlink transmission utilizing communication links 130 of EFB 103 are described further with respect to FIGS. 3A-5B with particular emphasis on FIG. 4. Additionally, uplink transmission utilizing communication links of EFB 103 are also described further with respect to FIGS. 3A-5B with particular emphasis on FIGS. 5A-5B.

In some embodiments, EFB 103 is indirectly coupled to CMS 106 via an Aircraft Interface Device (AID) 104. AID 104 can be wired to CMS 106, with EFB 103 coupled to AID 104 through a wired or wireless connection. AID 104 acts as a network gateway for EFB 103, where messages intended for EFB 103 are first received at AID 104 and forwarded to EFB 103. Like EFB 103, AID 104 includes its own communication links 134 that support datalink transmission with one or more ground stations 118. For example, AID 104 includes one or more broadband satellite communication links (SATCOM-BB), WiFi links, or cellular links (e.g., 5th generation Long Term Evolution (5G LTE) links) that can be used to transmit datalink messages with a ground station 118. When coupled with EFB 103, both EFB 103 and AID 104 each have their own respective communication links 130, 134 that can be used instead of the communication links 132 associated with the CMS 106. For example, a downlink message originating from EFB 103 or another avionics device 105 can be forwarded to AID 104 and transmitted using one of the AID communication links 134 to the ground station 118. Uplink messages can also be received over one of these communication links 134, as subsequently described. In some embodiments, datalink messages are communicated using the links associated with the EFB 103 and AID 104 based on the message type, for example, non-safety messages.

Figure 2:
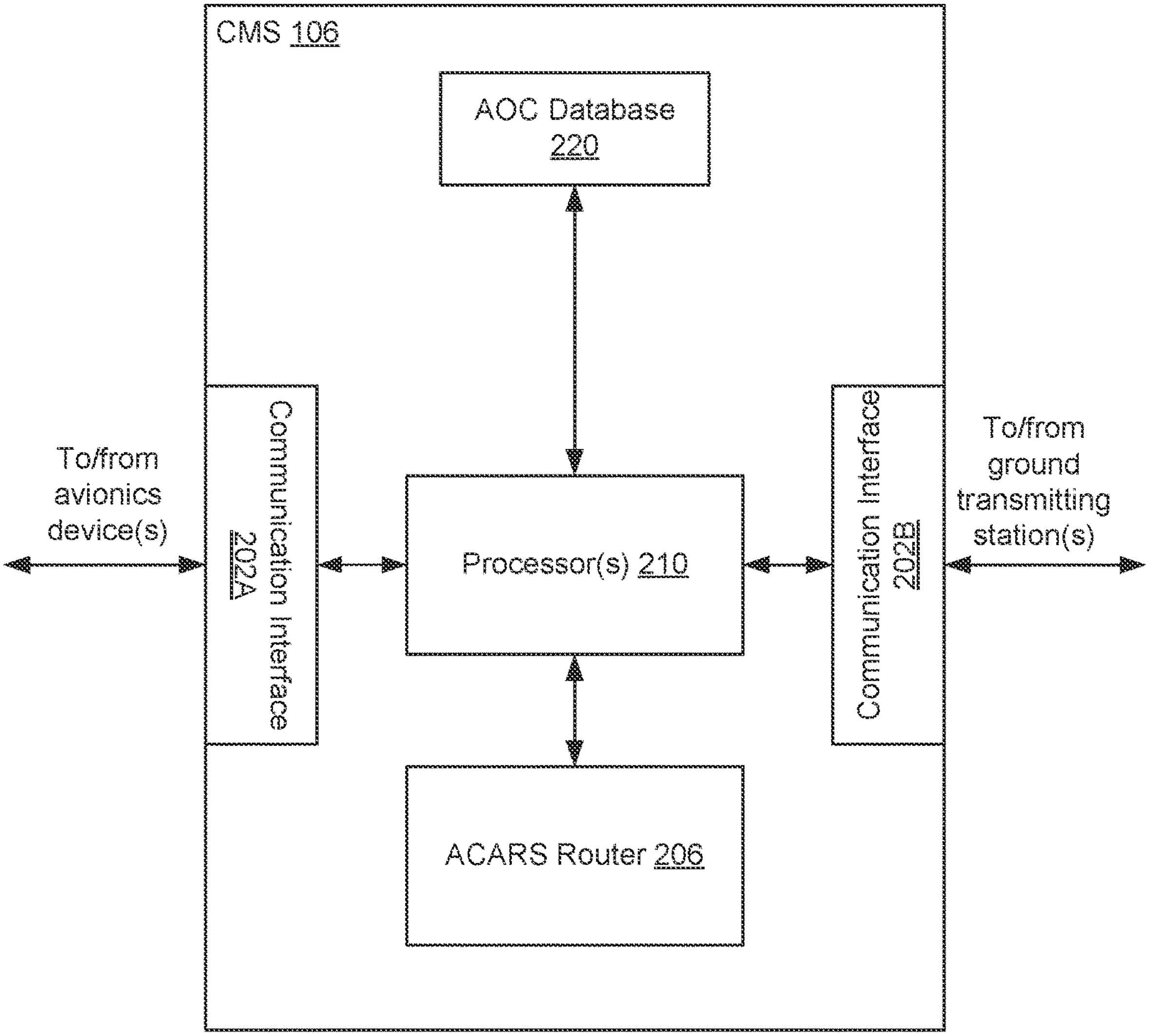
FIG. 2 depicts a block diagram of a communications management system, as described in one or more embodiments.

One embodiment of a CMS 106 is depicted in FIG. 2. CMS 106 generally acts both as a datalink manager to manage datalink messages sent from the vehicle 102 to the ground station 118, as well as a router to route datalink messages sent from a ground station 118 to the appropriate receiving entity, such as EFB 103 or other avionics device 105. In some embodiments, CMS 106 is a communications management unit (CMU), a communications management function (CMF) executed by one or more processors, or a flight management system (FMS).

In the exemplary embodiment of FIG. 2, when an avionics device 105 generates a downlink message, the message is received at communication interface 202A of CMS 106. Communication interface 202A is, in an embodiment, an ARINC 619 (A619) interface. An ACARS router 206 determines which of the ground stations 118 the downlink message should be transmitted to. When the downlink message is ready to be transmitted, it is output from communication interface 202B (e.g., an ARINC A618 interface) to the intended ground station 118 via an appropriate communication link 132. Example communication links 132 used by the CMS 106 include a high frequency (HF) link, a very high frequency (VHF) link, and a satellite communications (SATCOM) link. For some of these communication links, a third-party datalink service provider (DSP) is used to provide the downlink message to the ground station 118. In the uplink direction, one of the ground stations 118 generates and transmits a message to vehicle 102, which is received (e.g., from the datalink service provider) at communication interface 202B. After processing the uplink message, communication interface 202A receives the message and transmits it to the appropriate avionics device, which can include EFB 103 or another avionics device 105.

To process downlink and uplink datalink messages, CMS 106 includes one or more processors 210 coupled to communication interfaces 202A, 202B. Processor 210 is configured for processing, transmitting, and optionally generating datalink messages based on one or more datalink protocols supported by vehicle 102. In the embodiment of FIG. 2, CMS 106 includes an aircraft operational control (AOC) database 220, which stores data that includes datalink protocols supported by these ground stations and other information for datalink communication. For example, when processor 210 receives a downlink message from one of the avionics devices, processor 210 can determine which communication link 132 should be used to transmit the downlink message to ground station 118, by accessing the information stored in AOC database 220. When CMS 106 receives a call from one of the avionics devices to generate a datalink message template, processor 210 accesses the information stored in AOC database 220 to generate the message template in the proper datalink format. In some embodiments, the downlink message originates from CMS 106. When CMS 106 receives an uplink message from one of the ground stations 118, processor 210 analyzes indicators (e.g., the label or sublabel) of the message and then determines which avionics device the message is intended for.

Referring to FIG. 1, each ground station 118 is a ground entity that is configured to communicate with vehicle 102. Each ground station 118 comprises one or more transmitters and receivers that send and receive messages from a vehicle. In some embodiments, ground station 118 includes, or is coupled to, a ground end system with processing circuitry that generates and processes datalink messages. Multiple ground stations can correspond to an airport or landing site, or may correspond to different landing sites. Examples of ground stations include an airline operator, air traffic controller, meteorological data application, maintenance data application, information services application, or other ground receiving entity. A ground station 118 can be implemented as a central system and/or can be distributed as multiple systems in a terrestrial network.

Figure 3A:
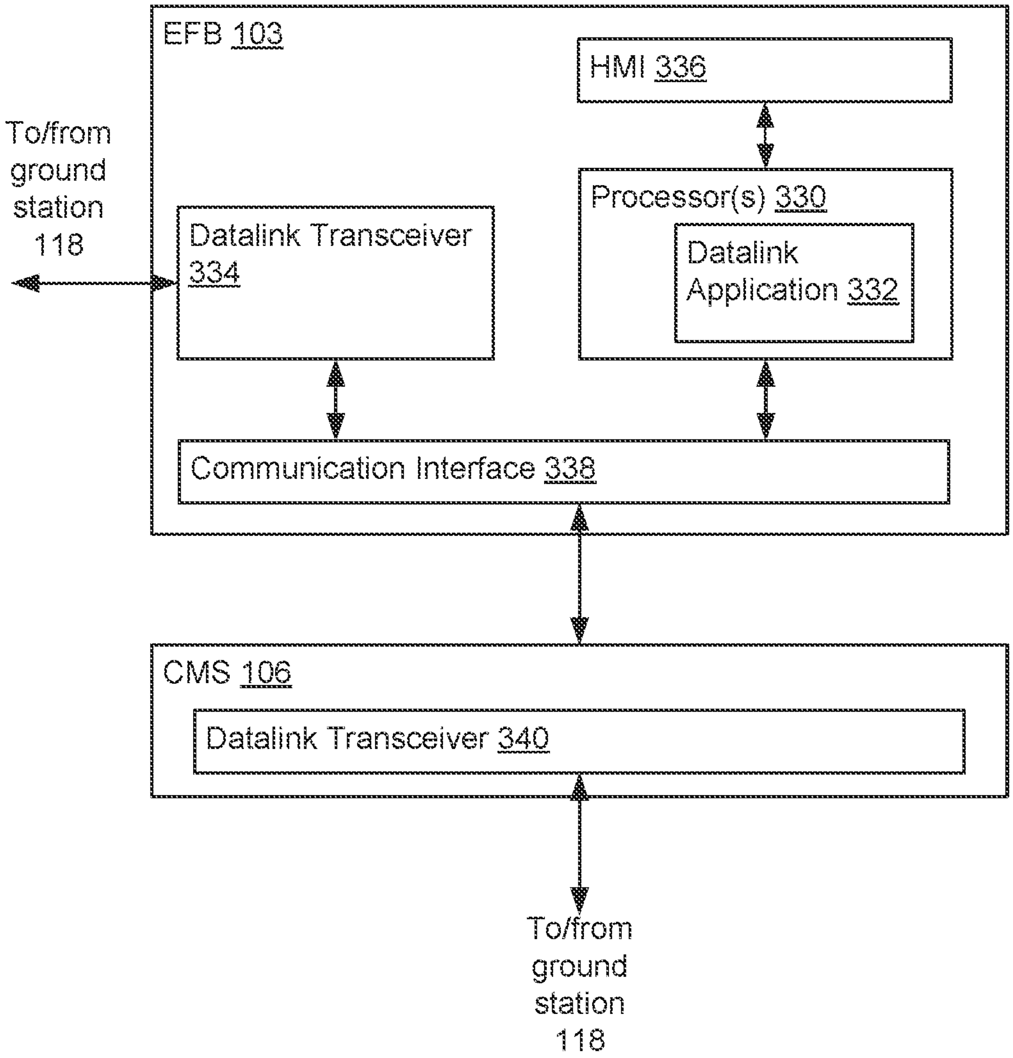
FIG. 3A depicts a block diagram of an EFB directly coupled to a communications management system, as described in one or more embodiments.
Figure 3B:
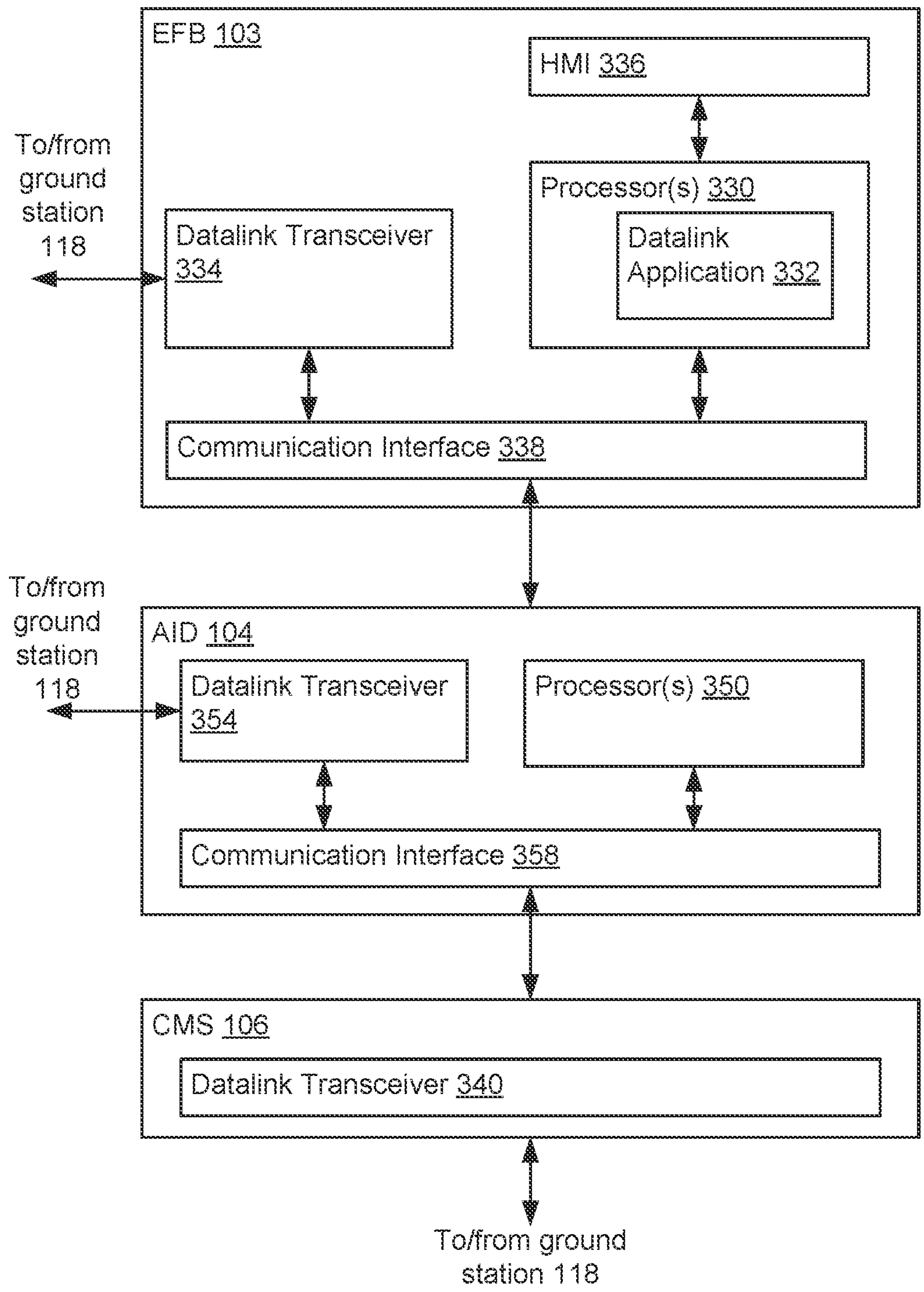
FIG. 3B depicts a block diagram of an EFB indirectly coupled to a communications management system via an AID, as described in one or more embodiments.

FIGS. 3A-3B depict embodiments of EFB 103 and AID 104. Specifically, FIG. 3A depicts an EFB 103 coupled directly to the CMS 106, while FIG. 3B depicts an EFB 103 coupled indirectly to the CMS 106 via an AID 104. EFB 103 functions identically as described in FIG. 1 and CMS 106 functions identically as described in FIGS. 1-2.

Referring first to FIG. 3A, EFB 103 includes one or more processors 330 configured to execute a datalink application 332. Datalink application 332 enables the processor 330, and the EFB 103 more generally, to perform datalink functions during navigation, such as to generate, process, and transmit datalink messages to a ground station 118. For example, when a datalink message is received using one of the communication links 132 associated with CMS 106, the CMS 106 forwards the message to EFB 103 via communication interface 338 where it is received by processor 330. Processor 330 is coupled to an HMI 336, which receives user input and is configured to display information such as datalink messages that are received from a ground station 118 and other datalink functions that are supported by datalink application 332.

EFB 103 is also equipped with a datalink transceiver 334 configured to establish a communication link with a ground station 118. In the downlink direction, an avionics device 105 generates a datalink message and forwards it to CMS 106 for transmission. CMS 106 is configured to forward the downlink message to EFB 103 instead of transmitting it to the intended ground station 118 using communication link 132. In some embodiments, CMS 106 determines whether it has a communication link available with a ground station, and transmits the downlink message when such a link is available. However, if no communication link 132 of the CMS 106 is available, it then forwards the downlink message to EFB 103 instead of queueing the message for transmission. In some embodiments, the CMS 106 forwards the downlink message to EFB 103 even if a communication link 132 is available, if EFB 103 has a higher preferred communication link 132 to transmit the message. Although FIG. 3A depicts EFB 103 with a dedicated datalink transceiver 334, in some embodiments EFB 103 interfaces directly or indirectly with a datalink transceiver associated with another system, such as CMS 106.

The downlink message is received at communication interface 338. Processor 330 processes the message and when it is approved (e.g., by receiving user input via HMI 336), processor 330 provides the message to datalink transceiver 334. Datalink transceiver 334 establishes a communication link 130 with the intended ground station 118, such as a cellular or Wi-Fi link, and transmits the downlink message using the communication link 130. Additionally, datalink transceiver 334 can also transmit messages generated by EFB 103.

In the uplink direction, datalink transceiver 334 is configured to receive a datalink message from a ground station 118 via one of the communication links 130 established by EFB 103. The uplink message is optionally processed by processor 330 and forwarded to CMS 106 via communication interface 338. CMS 106 processes the uplink message to determine which avionics device 105 the message is intended for, and forwards the uplink message to the intended avionics device 105.

Referring next to FIG. 3B, both EFB 103 and AID 104 are configured to transmit and receive datalink messages from ground station 118 using their respective communication links 130, 134. EFB 103 operates identically as described in FIG. 3A. In FIG. 3B, AID 104 also comprises a processor 350, communication interface 358, and datalink transceiver 354. AID 104 is equipped with its own communication links 134 independent of the communication links 132 used by CMS 106 and those of EFB 103 to transmit and receive datalink messages. In the downlink direction, an avionics device 105 generates a datalink message and forwards the message to CMS 106. In some embodiments, CMS 106 then forwards the downlink message to AID 104, which is received by communication interface 358. The datalink message is optionally processed by processor 350 and provided to datalink transceiver 354, which establishes a communication link 134 with a ground station 118 and transmits the datalink message. In some embodiments, AID 104 forwards the downlink message to EFB 103 so that EFB 103 transmits the downlink message to ground station 118 over one of its communication links 130, as described in FIG. 3A.

In some embodiments, EFB 103 is configured to utilize communication links associated with another EFB or AID 104 when communicating via datalink. In these embodiments, EFB 103 manages the non-traditional communication links (i.e., communication links not associated with CMS 106) to determine availability, preferred links for communicating a message, and processing datalink messages intended for EFB 103.

In the uplink direction, a datalink message can be received by EFB 103, AID 104, or both. If a datalink message is received by EFB 103, then EFB 103 can process and forward the message similarly as described in FIG. 3A, with the exception that EFB 103 first forwards the datalink message to AID 104, which then relays the message to CMS 106. If a datalink message is received by AID 104 at datalink transceiver 354, the datalink message is optionally processed by processor 350 and forwarded to CMS 106 by communication interface 358. As previously described, CMS 106 then processes the datalink message to determine which avionics device 105 the message is intended for, and forwards the datalink message to the intended avionics device 105.

As previously noted, CMS 106 is configured to receive and to transmit datalink messages received from one or more ground stations via one or more communication links. In some embodiments, CMS 106 includes datalink transceiver 340 configured for this purpose. Datalink transceiver 340 (as well as datalink transceivers 334, 354) includes one or more radios, such as a VHF data radio (VDR), HF data radio (HFDR), and/or SATCOM radio. In some embodiments, CMS 106 operates in a different network domain from the EFB 103 and AID 104 on vehicle 102. For example, CMS 106 operates in the avionics domain while EFB 103 and AID 104 operate in the information domain. AID 104 also acts to interface between the information domain and the avionics domain to CMS 106. By maintaining this domain separation, CMS 106 does not have direct interfaces to the communication links associated with EFB 103 or AID 104.

Figure 4:
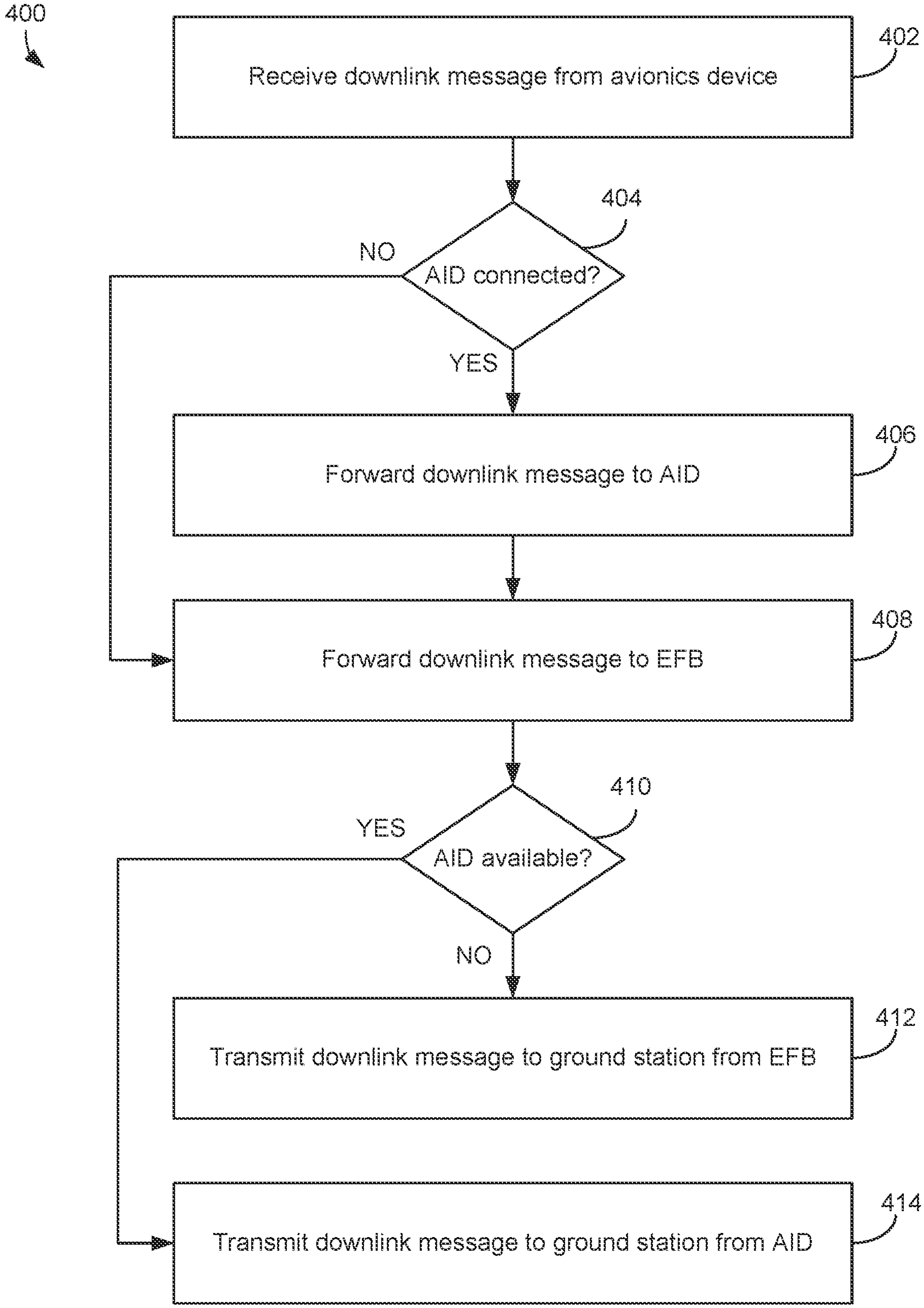
FIG. 4 depicts a flow diagram of a method for communicating a downlink message to at least one ground station, as described in one or more embodiments.
Figure 5A:
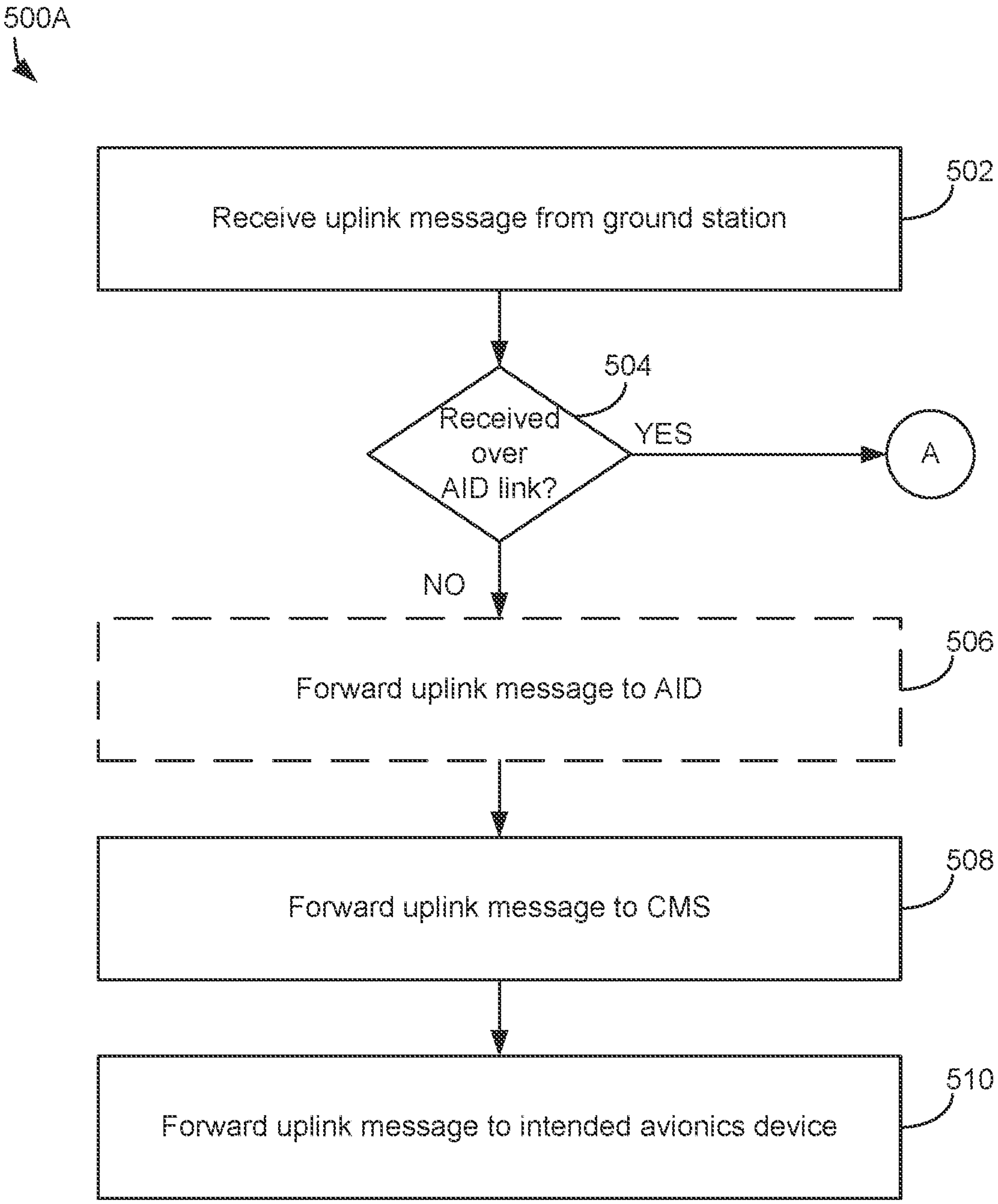
FIGS. 5A-5B depict flow diagrams of methods for processing an uplink message received from at least one ground station, as described in one or more embodiments.
Figure 5B:
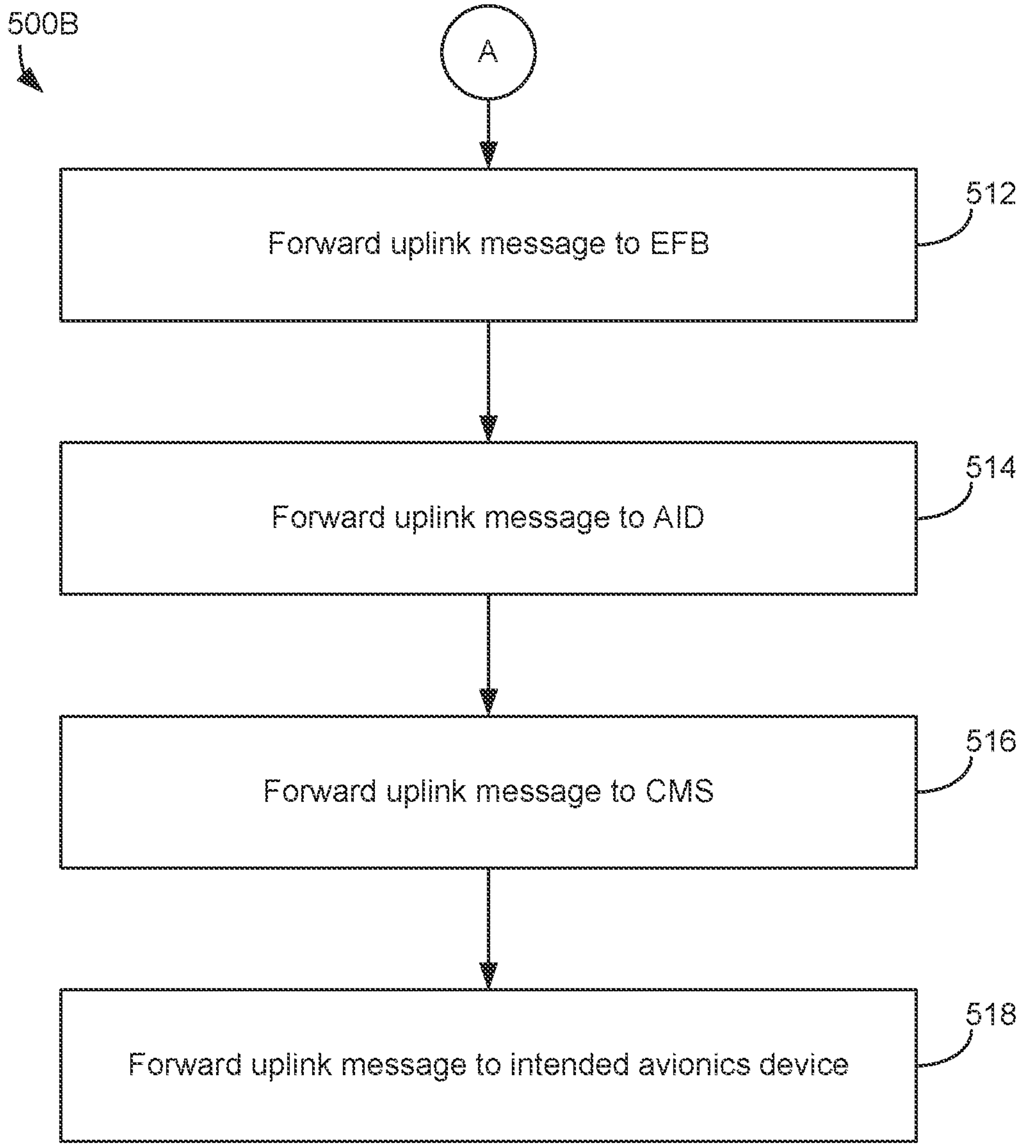

FIGS. 4-5B depict exemplary methods of processing datalink messages. FIG. 4 depicts a flow diagram of a method 400 for communicating a downlink message to at least one ground station. FIGS. 5A-5B depict flow diagrams of methods 500A-500B for processing an uplink message received from at least one ground station.

The methods generally described in FIGS. 4-5B may be implemented via the systems that are described with respect to FIGS. 1-3B, but may be implemented via other techniques as well. For example, the methods described in FIGS. 4-5B can be performed by CMS 106, EFB 103, and AID 104, in combination with other avionics devices 105 onboard the vehicle. The blocks of the flow diagrams have been arranged in a generally sequential manner for ease of explanation; however, it is to be understood that this arrangement is merely exemplary, and it should be recognized that the processing associated with the methods described herein (and the blocks shown in the Figures) may occur in a different order (for example, where at least some of the processing associated with the blocks is performed in parallel and/or in an event-driven manner).

Method 400 includes receiving a downlink message from an avionics device at block 402. For pedagogical explanation, a single avionics device is described understanding that any number of messages can be received from any number of avionics devices. Referring to FIG. 1, CMS 106 receives a downlink message from one of the avionics devices 105 for transmission to a ground station 118. From the perspective of the avionics device 105, the downlink message is then transmitted to the ground station 118.

Method 400 then proceeds to block 404 and determines whether there is an AID connected to the CMS. Such an AID 104 is connected to CMS 106 via a wired connection similar to other onboard avionics devices 105 connected to CMS 106. If there is an AID connected to the CMS, then method 400 forwards the downlink message from the CMS to the AID at block 406. If no AID is connected, then method 400 proceeds from block 404 to block 408 and forwards the downlink message directly to the EFB from the CMS. If the downlink message was forwarded to an AID at block 406, then method 400 proceeds to block 408 by forwarding the downlink message from the AID to the EFB.

Proceeding to block 410, method 400 determines whether an AID is available to send the downlink message. For example, CMS 106 determines whether the AID 104 includes one or more communication links 134 and whether there is sufficient bandwidth available to send the downlink message. If an AID is available at block 410, then method 400 proceeds to block 414 and transmits the downlink message to the ground station via a communication link 134 of the AID. Conversely, if there is no AID available (e.g., because no AID is connected or no communication links associated with the AID are open), then at block 412 method 400 transmits the downlink message to the ground station via a communication link of the EFB.

Referring next to FIG. 5A, method 500A includes receiving an uplink message from a ground station at block 502. For example, an uplink message can be received at EFB 103 via a communication link 130 associated with EFB 103, or at AID 104 via a communication link 134 associated with AID 104. In some embodiments, the uplink message is intended for an avionics device 105 separate from the AID 104 or EFB 103 that received the message. At block 504, method 500A determines whether the uplink message was received over a communication link associated with the AID. If yes, then method 500A proceeds to indicator A as shown in FIG. 5A, as further described. However, in some embodiments the uplink message is not received over an AID communication link. For example, an AID 104 may not be connected to CMS 106, or an AID communication link may not be available. The uplink message may instead be received over one of the communication links 130 associated with EFB 103.

Accordingly, method 500A proceeds from block 504 to block 506 and optionally forwards the uplink message to the AID. For example, if the message was received over a communication link 130 associated with EFB 103, then EFB

103 forwards the uplink message to AID 104. However, in some embodiments, EFB 103 receives an uplink message but is not coupled to an AID and is instead directly coupled to CMS 106. Therefore, block 506 is optional. At block 508, method 500A forwards the uplink message to the CMS. If EFB 103 is indirectly coupled to CMS 106 via AID 104, then method 500A proceeds sequentially from block 504 to block 506 and then to block 508 by forwarding the uplink message from EFB 103, to AID 104, and then forwarding the uplink message to CMS 106. If EFB 103 is directly coupled to CMS 106, then method 500A proceeds from block 504 directly to block 508 by forwarding the uplink message from EFB 103 to CMS 106.

Method 500A then forwards the uplink message to the intended avionics device at block 510. For example, upon receiving the uplink message from either EFB 103 or AID 104, CMS 106 then forwards the uplink message to one of the avionics devices 105. In some embodiments, CMS 106 processes the uplink message to determine which of the avionics devices 105 the uplink message is intended for based on the content of the message, and routes the message to the appropriate avionics device 105.

In some embodiments, the uplink message is received over a communication link associated with the AID, which occurs when an AID 104 is coupled to CMS 106 and a communication link is available. Uplink message processing for messages received by the AID is further illustrated with respect to method 500B depicted in FIG. 5B. Method 500B begins from indicator A of method 500A when an uplink message is received over a communication link associated with the AID at block 504. Method 500B then proceeds to block 512 and forwards the uplink message from the AID back to the EFB for additional processing, e.g., to determine that the uplink message is intended for another avionics device 105 and not for EFB 103. Then at block 514, method 500B forwards the message back from the EFB to the AID.

After forwarding the uplink message back to the AID, method 500B then proceeds to block 516 and forwards the uplink message from the AID to the CMS. From block 516, method 500B forwards the uplink message to the intended avionics device at block 518. Similar to method 500A, the CMS can process the uplink message to determine which avionics device the message is intended for, and then routes the uplink message to the appropriate avionics device. Methods 500A-500B can be repeated for each uplink message that is received by the EFB or AID.

The methods and techniques described herein may be implemented in digital electronic circuitry, or with a programmable processor (for example, a special-purpose processor or a general-purpose processor such as a computer) firmware, software, or in various combinations of each. Apparatus embodying these techniques may include appropriate input and output devices, a programmable processor, and a storage medium tangibly embodying program instructions for execution by the programmable processor. A process embodying these techniques may be performed by a programmable processor executing a program of instructions to perform desired functions by operating on input data and generating appropriate output. The techniques may advantageously be implemented in one or more programs that are executable on a programmable system including at least one programmable processor coupled to receive data and instructions from, and to transmit data and instruction to, a data storage system, at least one input device, and at least one output device. Generally, a processor will receive instructions and data from a read-only memory and/or a random-access memory. Storage devices suitable for tangibly embodying computer program instructions and data include all forms of non-volatile memory, including by way of example semiconductor memory devices, such as erasable programmable read-only memory (EPROM), electrically-erasable programmable read-only memory (EEPROM), and flash memory devices; magnetic disks such as internal hard disks and removable disks; magneto-optical disks; and the like. Any of the foregoing may be supplemented by, or incorporated in, specially-designed application specific integrated circuits (ASICs.)

EXAMPLE EMBODIMENTS

Example 1 includes a system, comprising: a communications management system coupled to a vehicle, wherein the communications management system is configured to receive a downlink message from an avionics device onboard the vehicle; and an electronic flight bag (EFB) coupled to the communications management system, wherein the EFB is configured for datalink communications using at least one communication link associated with the EFB, wherein the EFB is configured to receive the downlink message, wherein the EFB is configured to transmit the downlink message to at least one ground station via the at least one communication link associated with the EFB.

Example 2 includes the system of Example 1, wherein the EFB is configured to receive an uplink message from the at least one ground station via the at least one communication link associated with the EFB, wherein the uplink message is intended for the avionics device, wherein the EFB is configured to forward the uplink message to the communications management system, wherein the communications management system is configured to forward the uplink message to the avionics device.

Example 3 includes the system of any of Examples 1-2, further comprising an aircraft interface device (AID) coupled between the EFB and the communications management system, wherein the AID is configured for datalink communications using at least one communication link associated with the AID, wherein the AID is configured to receive the downlink message from the communications management system, wherein the AID is configured to transmit the downlink message to the at least one ground station via the at least one communication link associated with the AID.

Example 4 includes the system of any of Examples 1-3, further comprising an aircraft interface device (AID) coupled between the EFB and the communications management system, wherein the AID is configured for datalink communications using at least one communication link associated with the AID, wherein the AID is configured to receive an uplink message from the at least one ground station, wherein the uplink message is intended for the avionics device, wherein the AID is configured to forward the uplink message to the EFB, wherein the EFB is configured to forward the uplink message back to the AID, wherein the AID is configured to forward the uplink message to the communications management system, wherein the communications management system is configured to forward the uplink message to the avionics device.

Example 5 includes the system of any of Examples 1-4, wherein the communications management system is configured for datalink communication using at least one communication link associated with the communications management system, wherein the communications management system is configured to determine whether at least one communication link associated with the EFB and/or an aircraft interface device (AID) coupled between the EFB and the communications management system is available, wherein the communications management system is configured to forward the downlink message to at least one of the EFB and/or the AID instead of transmitting the downlink message via the at least one communication link associated with the communications management system when the at least one communication link associated with the EFB and/or the AID is available.

Example 6 includes the system of any of Examples 1-5, wherein the at least one communication link comprises a WiFi, cellular, and/or broadband satellite communications (SATCOM-BB) communication link.

Example 7 includes a method for datalink communication between a vehicle and at least one ground station, the method comprising: for a downlink message: receiving, at a communications management system coupled to the vehicle, a first downlink message from an avionics device communicatively coupled to the communications management system; forwarding the first downlink message from the communications management system to at least one of: an electronic flight bag (EFB) and/or an aircraft interface device (AID), wherein the EFB and/or the AID are configured for datalink communications using at least one communication link associated with the EFB and/or the AID; and transmitting the first downlink message from at least one of: the EFB and/or the AID to the at least one ground station using the at least one communication link; and/or for an uplink message: receiving, at the at least one of: the EFB and/or the AID, a first uplink message from the at least one ground station via the at least one communication link, wherein the first uplink message is intended for the avionics device; forwarding the first uplink message from the at least one of: the EFB and/or the AID to the communications management system; and forwarding the first uplink message from the communications management system to the avionics device.

Example 8 includes the method of Example 7, wherein the at least one communication link comprises a WiFi, cellular, and/or broadband satellite communications (SATCOM-BB) communication link.

Example 9 includes the method of any of Examples 7-8, wherein forwarding the first downlink message comprises: forwarding the first downlink message from the communications management system to the AID when the AID is connected to the communications management system; and forwarding the first downlink message from the communications management system to the EFB when the EFB is directly coupled to the communications management system.

Example 10 includes the method of any of Examples 7-9, comprising: forwarding the first downlink message from the communications management system to the AID; forwarding the first downlink message from the AID to the EFB; and transmitting the first downlink message to the at least one ground station via the at least one communication link associated with the EFB.

Example 11 includes the method of any of Examples 7-10, comprising: forwarding the first downlink message from the communications management system to the AID; forwarding the first downlink message from the AID to the EFB; forwarding the first downlink message from the EFB back to the AID; and transmitting the first downlink message to the at least one ground station via the at least one communication link associated with the AID.

Example 12 includes the method of any of Examples 7-11, comprising: receiving the first uplink message on the at least one communication link associated with the EFB; forwarding the first uplink message from the EFB to the AID; and forwarding the first uplink message from the AID to the communications management system.

Example 13 includes the method of any of Examples 7-12, comprising: receiving the first uplink message on the at least one communication link associated with the AID; forwarding the first uplink message from the AID to the EFB; forwarding the first uplink message from the EFB back to the AID; and forwarding the first uplink message from the AID to the communications management system.

Example 14 includes the method of any of Examples 7-13, comprising: receiving the first uplink message on the at least one communication link associated with the EFB; and forwarding the first uplink message directly from the EFB to the communications management system.

Example 15 includes an avionics device configured to be coupled to a communications management system onboard a vehicle, the avionics device comprising: a communication interface, wherein the communication interface is configured to receive a downlink message from the communications management system; at least one processor coupled to the communication interface, wherein the at least one processor is configured to execute a datalink application for processing datalink messages including the downlink message; and a datalink transceiver coupled to the communication interface, wherein the datalink transceiver is configured to establish at least one communication link with at least one ground station, wherein the datalink transceiver is configured to transmit the downlink message via the at least one communication link.

Example 16 includes the avionics device of Example 15, wherein the at least one processor is configured to determine that the downlink message originates from another avionics device coupled to the communications management system.

Example 17 includes the avionics device of any of Examples 15-16, wherein the datalink transceiver is configured to receive an uplink message from the at least one ground station via the at least one communication link, wherein the at least one processor is configured to determine that the uplink message is intended for another avionics device coupled to the communications management system, wherein the communication interface is configured to forward the uplink message to the communications management system.

Example 18 includes the avionics device of Example 17, wherein the avionics device is an electronic flight bag (EFB), wherein the communication interface is configured to forward the uplink message to an aircraft interface device (AID) coupled between the communications management system and the EFB, wherein the communication interface is configured to receive the downlink message from the AID.

Example 19 includes the avionics device of any of Examples 17-18, wherein the avionics device is an aircraft interface device (AID), wherein the communication interface is configured to forward the downlink message to an electronic flight bag (EFB), wherein the AID is configured to receive the uplink message from the EFB, and to forward the uplink message to the communications management system.

Example 20 includes the avionics device of any of Examples 15-19, wherein the at least one communication link comprises a WiFi, cellular, and/or broadband satellite communications (SATCOM-BB) communication link.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A system, comprising:

a communications management system coupled to a vehicle, wherein the communications management system is configured to receive a downlink message from an avionics device onboard the vehicle and to determine if a communication link is available to transmit the downlink message to a ground station; and an electronic flight bag (EFB) coupled to the communications management system, wherein the EFB is configured for datalink communications using at least one communication link associated with the EFB, wherein the EFB is configured to receive the downlink message from the communications management system when the communications management system determines that a communication link is not available, wherein the EFB is configured to transmit the downlink message to the ground station via the at least one communication link associated with the EFB.

2. The system of claim 1, wherein the EFB is configured to receive an uplink message from the at least one ground station via the at least one communication link associated with the EFB, wherein the uplink message is intended for the avionics device, wherein the EFB is configured to forward the uplink message to the communications management system, wherein the communications management system is configured to forward the uplink message to the avionics device.

3. The system of claim 1, further comprising an aircraft interface device (AID) coupled between the EFB and the communications management system, wherein the AID is configured for datalink communications using at least one communication link associated with the AID, wherein the AID is configured to receive the downlink message from the communications management system, wherein the AID is configured to transmit the downlink message to the at least one ground station via the at least one communication link associated with the AID.

4. The system of claim 1, further comprising an aircraft interface device (AID) coupled between the EFB and the communications management system, wherein the AID is configured for datalink communications using at least one communication link associated with the AID, wherein the AID is configured to receive an uplink message from the at least one ground station, wherein the uplink message is intended for the avionics device, wherein the AID is configured to forward the uplink message to the EFB, wherein the EFB is configured to forward the uplink message back to the AID, wherein the AID is configured to forward the uplink message to the communications management system, wherein the communications management system is configured to forward the uplink message to the avionics device.

5. The system of claim 1, wherein the communications management system is configured for datalink communication using at least one communication link associated with the communications management system, wherein the communications management system is configured to determine whether at least one communication link associated with the EFB and/or an aircraft interface device (AID) coupled between the EFB and the communications management system is available, wherein the communications management system is configured to forward the downlink message to at least one of the EFB and/or the AID instead of transmitting the downlink message via the at least one communication link associated with the communications management system when the at least one communication link associated with the EFB and/or the AID is available.

6. The system of claim 1, wherein the at least one communication link comprises a WiFi, cellular, and/or broadband satellite communications (SATCOM-BB) communication link.

7. A method for datalink communication between a vehicle and at least one ground station, the method comprising:

for a downlink message:

receiving, at a communications management system coupled to the vehicle, a first downlink message from an avionics device communicatively coupled to the communications management system;

determining whether a communication link of the communications management system is available to transmit the first downlink message;

forwarding the first downlink message from the communications management system to at least one of: an electronic flight bag (EFB) and/or an aircraft interface device (AID) when the communications link of the communications management system is not available to transmit the first downlink message, wherein the EFB and/or the AID are configured for datalink communications using at least one communication link associated with the EFB and/or the AID; and transmitting the first downlink message from at least one of: the EFB and/or the AID to the at least one ground station using the at least one communication link; and for an uplink message:

receiving, at the at least one of: the EFB and/or the AID, a first uplink message from the at least one ground station via the at least one communication link, wherein the first uplink message is intended for the avionics device;

forwarding the first uplink message from the at least one of: the EFB and/or the AID to the communications management system; and forwarding the first uplink message from the communications management system to the avionics device.

8. The method of claim 7, wherein the at least one communication link comprises a WiFi, cellular, and/or broadband satellite communications (SATCOM-BB) communication link.

9. The method of claim 7, wherein forwarding the first downlink message comprises:

forwarding the first downlink message from the communications management system to the AID when the AID is connected to the communications management system; and forwarding the first downlink message from the communications management system to the EFB when the EFB is directly coupled to the communications management system.

10. The method of claim 7, comprising:

forwarding the first downlink message from the communications management system to the AID;

forwarding the first downlink message from the AID to the EFB; and transmitting the first downlink message to the at least one ground station via the at least one communication link associated with the EFB.

11. The method of claim 7, comprising:

forwarding the first downlink message from the communications management system to the AID;

forwarding the first downlink message from the AID to the EFB;

forwarding the first downlink message from the EFB back to the AID; and transmitting the first downlink message to the at least one ground station via the at least one communication link associated with the AID.

12. The method of claim 7, comprising:

receiving the first uplink message on the at least one communication link associated with the EFB;

forwarding the first uplink message from the EFB to the AID; and forwarding the first uplink message from the AID to the communications management system.

13. The method of claim 7, comprising:

receiving the first uplink message on the at least one communication link associated with the AID;

forwarding the first uplink message from the AID to the EFB;

forwarding the first uplink message from the EFB back to the AID; and forwarding the first uplink message from the AID to the communications management system.

14. The method of claim 7, comprising:

receiving the first uplink message on the at least one communication link associated with the EFB; and forwarding the first uplink message directly from the EFB to the communications management system.

15. An avionics device configured to be coupled to a communications management system onboard a vehicle, the avionics device comprising:

a communication interface, wherein the communication interface is configured to receive a downlink message from the communications management system that originated at another avionics device, and wherein the communications management system determined that a communications link of the communications management system is not available to transmit the downlink message;

at least one processor coupled to the communication interface, wherein the at least one processor is configured to execute a datalink application for processing datalink messages including the downlink message; and a datalink transceiver coupled to the communication interface, wherein the datalink transceiver is configured to establish at least one communication link with at least one ground station, wherein the datalink transceiver is configured to transmit the downlink message via the at least one communication link.

16. The avionics device of claim 15, wherein the at least one processor is configured to determine that the downlink message originates from another avionics device coupled to the communications management system.

17. The avionics device of claim 15, wherein the datalink transceiver is configured to receive an uplink message from the at least one ground station via the at least one communication link, wherein the at least one processor is configured to determine that the uplink message is intended for another avionics device coupled to the communications management system, wherein the communication interface is configured to forward the uplink message to the communications management system.

18. The avionics device of claim 17, wherein the avionics device is an electronic flight bag (EFB), wherein the communication interface is configured to forward the uplink message to an aircraft interface device (AID) coupled between the communications management system and the EFB, wherein the communication interface is configured to receive the downlink message from the AID.

19. The avionics device of claim 17, wherein the avionics device is an aircraft interface device (AID), wherein the communication interface is configured to forward the downlink message to an electronic flight bag (EFB), wherein the AID is configured to receive the uplink message from the EFB, and to forward the uplink message to the communications management system.

20. The avionics device of claim 15, wherein the at least one communication link comprises a WiFi, cellular, and/or broadband satellite communications (SATCOM-BB) communication link.

* * * * *